(12) United States Patent
Busquets et al.

(10) Patent No.: US 11,990,819 B2
(45) Date of Patent: May 21, 2024

(54) ELECTRIC AND HYDRAULIC MACHINE

(71) Applicant: Bosch Rexroth Corporation, Charlotte, NC (US)

(72) Inventors: Enrique Busquets, Fountain Inn, SC (US); Uwe Neumann, Fountain Inn, SC (US); Andrea Vacca, Lafayette, IN (US); Federico Zappaterra, Ferra (IT)

(73) Assignee: Bosch Rexroth Corporation, Charlotte, NC (US)

( * ) Notice: Subject to any disclaimer, the term of this patent is extended or adjusted under 35 U.S.C. 154(b) by 585 days.

(21) Appl. No.: 17/103,191

(22) Filed: Nov. 24, 2020

(65) Prior Publication Data

US 2022/0166284 A1 May 26, 2022

(51) Int. Cl.
| | |
|---|---|
| *H02K 5/20* | (2006.01) |
| *F04B 53/08* | (2006.01) |
| *F04C 2/10* | (2006.01) |
| *H02K 9/19* | (2006.01) |
| *F04C 2/08* | (2006.01) |

(Continued)

(52) U.S. Cl.
CPC ............... *H02K 5/20* (2013.01); *F04B 53/08* (2013.01); *F04C 2/102* (2013.01); *H02K 9/19* (2013.01); *F04C 2/084* (2013.01); *F04C 11/008* (2013.01); *F04C 15/0096* (2013.01); *F04C 2240/30* (2013.01); *F04C 2240/40* (2013.01); *F04D 13/06* (2013.01); *F04D 25/082* (2013.01); *F04D 29/5806* (2013.01)

(58) Field of Classification Search
CPC .......... F04B 53/08; F04C 2/084; F04C 2/102; F04C 11/008; F04C 15/0096; F04C 2240/30; F04C 2240/40; F04C 2240/402; F04C 11/00; F04C 11/001; F04C 11/003; F04D 13/06; F04D 25/082; F04D 29/5806; H02K 5/20; H02K 9/19; H02K 9/197; H02K 16/00; H02K 16/02; H02K 16/025; H02K 16/04
USPC ....... 417/423.5, 355, 356; 418/166–171, 214
See application file for complete search history.

(56) References Cited

U.S. PATENT DOCUMENTS

| | | |
|---|---|---|
| 2,871,793 A | 2/1959 | Michie et al. |
| 3,395,643 A | 8/1968 | Whitmore |

(Continued)

*Primary Examiner* — Devon C Kramer
*Assistant Examiner* — Joseph S. Herrmann
(74) *Attorney, Agent, or Firm* — Michael Best & Friedrich LLP

(57) ABSTRACT

An electric and hydraulic machine includes a housing defining a motor chamber and a pump chamber, a motor comprising a rotor and a stator positioned within the motor chamber, and a pump comprising a pumping element positioned within the pump chamber, the pumping element movable by the motor to displace fluid in the pump chamber. The pump chamber includes a low-pressure chamber and a high-pressure chamber, a unit inlet defined by the housing and in communication with the low-pressure chamber, and a unit outlet defined by the housing and in communication with the high-pressure chamber. The pump chamber is positioned radially inward of the motor chamber such that the pump is nested within the motor. A radial cooling channel extends in a radial direction from the low-pressure chamber to the motor chamber such that fluid in the pump chamber communicates with the rotor and the stator to cool the motor.

20 Claims, 10 Drawing Sheets

(51) Int. Cl.
    *F04C 11/00*    (2006.01)
    *F04C 15/00*    (2006.01)
    *F04D 13/06*    (2006.01)
    *F04D 25/08*    (2006.01)
    *F04D 29/58*    (2006.01)

(56) References Cited

U.S. PATENT DOCUMENTS

| | | |
|---|---|---|
| 3,588,284 A | 6/1971 | Sturlason et al. |
| 4,601,643 A | 7/1986 | Seidel |
| 5,221,191 A | 6/1993 | Leyderman et al. |
| 5,797,734 A | 8/1998 | Kizer et al. |
| 5,997,261 A | 12/1999 | Kershaw et al. |
| 6,585,498 B2 | 7/2003 | Arbogast et al. |
| 6,612,822 B2 | 9/2003 | Buschur et al. |
| 6,733,249 B2 | 5/2004 | Maier et al. |
| 6,884,043 B2 | 4/2005 | Kimberlin et al. |
| 7,267,532 B2 | 9/2007 | Krebs |
| 7,344,367 B2 * | 3/2008 | Manole ............... F04C 18/321 418/173 |
| 7,367,787 B2 | 5/2008 | Arbogast |
| 7,381,036 B2 | 6/2008 | Hundt et al. |
| 7,641,457 B2 | 1/2010 | Asai et al. |
| 8,257,071 B2 | 9/2012 | Matsuki et al. |
| 8,376,720 B2 * | 2/2013 | Rosalik, Jr. ............. F04C 2/102 417/356 |
| 8,696,326 B2 | 4/2014 | Hadar et al. |
| 8,876,501 B2 | 11/2014 | Kawano et al. |
| 9,297,380 B2 * | 3/2016 | Zubenin ................ F04C 11/003 |
| 9,581,158 B2 | 2/2017 | Hadar et al. |
| 10,190,584 B2 | 1/2019 | Yoon |
| 10,539,134 B2 | 1/2020 | Afshari |
| 2004/0136847 A1 | 7/2004 | Arbogast et al. |
| 2005/0031465 A1 | 2/2005 | Dreiman et al. |
| 2005/0201884 A1 * | 9/2005 | Dreiman ............... F04C 18/321 418/173 |
| 2015/0071795 A1 | 3/2015 | Vazquez et al. |
| 2015/0292503 A1 * | 10/2015 | Kopp .................... F04C 14/223 418/5 |
| 2017/0167491 A1 | 6/2017 | Reul et al. |
| 2019/0003477 A1 | 1/2019 | Graves et al. |
| 2019/0234406 A1 | 8/2019 | Homma et al. |
| 2020/0018309 A1 | 1/2020 | Kobayashi et al. |

* cited by examiner

ELECTRIC AND HYDRAULIC MACHINE

BACKGROUND

The present disclosure relates to an electric and hydraulic machine. More particularly, the present disclosure relates to an integrated motor/pump arrangement.

SUMMARY

In one aspect, an electric and hydraulic machine includes a housing defining a motor chamber and a pump chamber, a motor comprising a rotor and a stator positioned within the motor chamber, and a pump comprising a pumping element positioned within the pump chamber. The pumping element is movable by the motor to displace fluid in the pump chamber. The pump chamber includes a low-pressure chamber and a high-pressure chamber, a unit inlet defined by the housing and in communication with the low-pressure chamber, and a unit outlet defined by the housing and in communication with the high-pressure chamber. The pump chamber is positioned radially inward of the motor chamber such that the pump is nested within the motor. The electric and hydraulic machine further includes a radial cooling channel extending in a radial direction from the low-pressure chamber to the motor chamber such that fluid in the pump chamber communicates with the rotor and the stator to cool the motor.

In another aspect, a method of operating an electric and hydraulic machine includes providing a working fluid to a low-pressure chamber of a pump via an inlet of the pump, actuating a motor within a housing, the motor located within a motor chamber defined by the housing, driving the pump with the motor to displace the working fluid from the low-pressure chamber, providing the working fluid displaced by the pump to an outlet of the pump, and cooling the motor with the working fluid by directing a first portion of the working fluid from the low-pressure chamber through a radial cooling channel to the motor chamber.

In yet another aspect, an electric and hydraulic machine includes a housing defining a motor chamber and a pump chamber, a motor comprising a rotor and a stator positioned within the motor chamber, and a pump comprising a pumping element positioned within the pump chamber. The pumping element is movable by the motor to displace fluid in the pump chamber. The pump chamber includes a low-pressure chamber and a high-pressure chamber, a unit inlet defined by the housing and in communication with the low-pressure chamber, and a unit outlet defined by the housing and in communication with the high-pressure chamber. The pump chamber is positioned radially inward of the motor chamber such that the pump is nested within the motor. The electric and hydraulic machine further includes a first flow route for a working fluid of the pump, the first flow route extending from the low-pressure chamber, to the pumping element, to the high-pressure chamber, and to the unit outlet. The electric and hydraulic machine further includes a second flow route for a working fluid of the pump, the second flow route extending from the low-pressure chamber, through a radial cooling channel extending radially outward from the low-pressure chamber, and into the motor chamber.

In yet another aspect, an electric and hydraulic machine includes a first housing defining a first motor chamber and a first pump chamber, a first motor comprising a rotor and a stator positioned within the first motor chamber, and a first pump comprising a first pumping element positioned within the first pump chamber. The first pumping element is movable by the first motor to displace fluid in the first pump chamber. The first pump chamber includes a low-pressure chamber and a high-pressure chamber, a unit inlet defined by the first housing and in communication with the low-pressure chamber, and a unit outlet defined by the first housing and in communication with the high-pressure chamber. The first pump chamber is positioned radially inward of the first motor chamber such that the first pump is nested within the first motor. The electric and hydraulic machine further includes a second housing defining a second motor chamber and a second pump chamber, the second housing axially aligned with and coupled to the first housing, a second motor comprising a rotor and a stator positioned within the second motor chamber, and a second pump comprising a second pumping element positioned within the second pump chamber. The second pumping element is movable by the second motor to displace fluid in the second pump chamber. The second pump chamber includes a low-pressure chamber and a high-pressure chamber, a unit inlet interconnecting the low-pressure chamber of the first pump with the low-pressure chamber of the second pump, and a unit outlet interconnecting the high-pressure chamber of the first pump with the high-pressure chamber of the second pump.

In yet another aspect, a method of operating an electric and hydraulic machine includes providing a working fluid to a low-pressure chamber of a first pump via an inlet of the first pump, providing the working fluid to a low-pressure chamber of a second pump via the low-pressure chamber of the of the first pump and an inlet of the second pump, unpressurized by the first pump, driving the first pump with a first motor to displace the working fluid from the low-pressure chamber of the first pump, driving the second pump with a second motor to displace the working fluid from the low-pressure chamber of the second pump, providing the working fluid displaced by the first pump to a high-pressure chamber of the first pump and to an outlet of the first pump, and providing the working fluid displaced by the second pump to the high-pressure chamber of the first pump through the outlet of the second pump.

In yet another aspect, an electric and hydraulic machine includes a first pump-motor arrangement located within a first housing and including a first pump nested within a first motor, the first pump comprising a low-pressure chamber and a high-pressure chamber. The electric and hydraulic machine further includes a second pump-motor arrangement located within a second housing and including a second pump nested within a second motor, the second pump comprising a low-pressure chamber and a high-pressure chamber. The first housing is coupled to the second housing. The low-pressure chamber of the first pump and the low-pressure chamber of the second pump collectively form a single low-pressure chamber.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
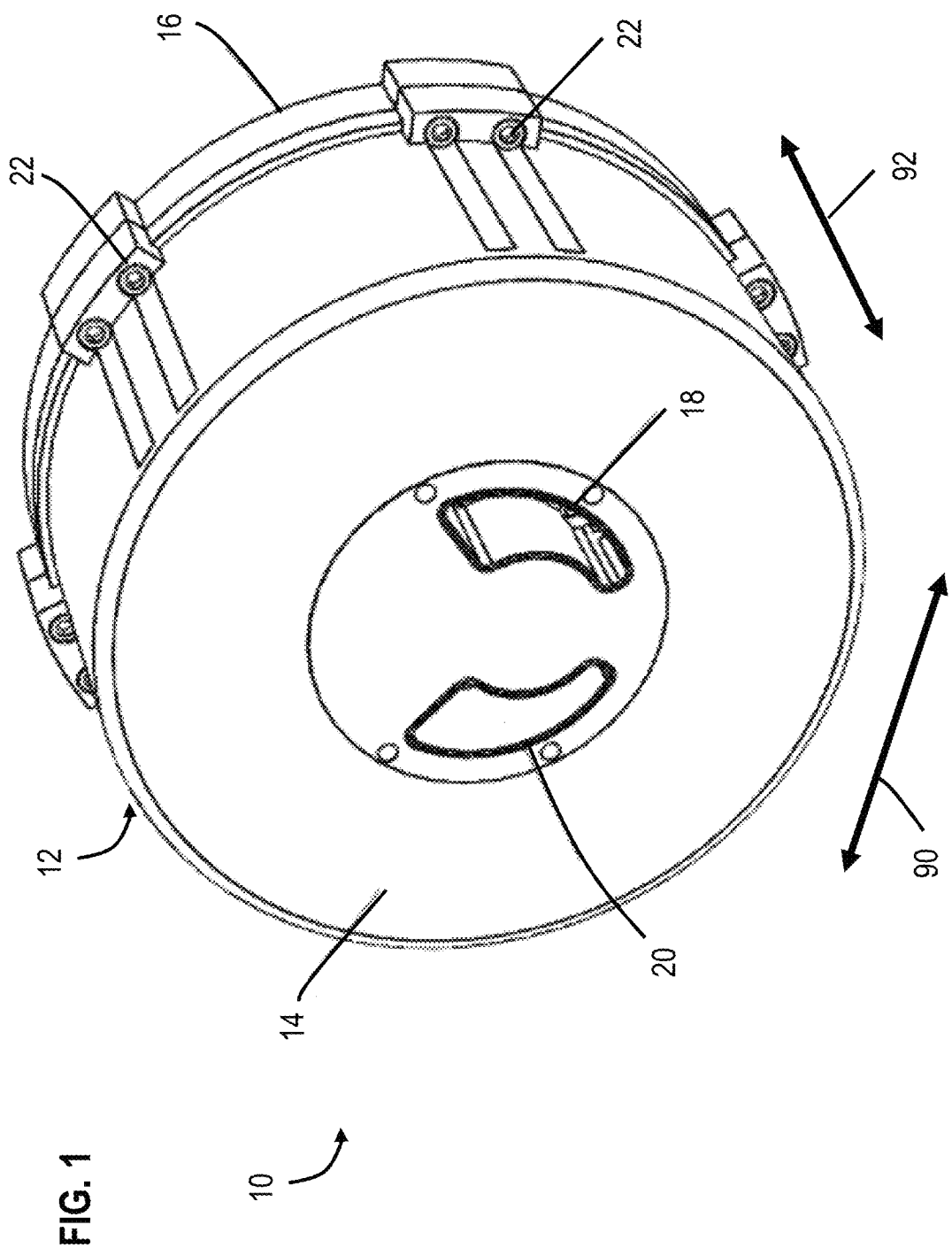
FIG. 1 is a perspective view of an electric and hydraulic machine.

FIG. 1 illustrates an electric and hydraulic machine 10 defining a motor 30 and a pump 44. A housing 12 includes a first housing member 14 and a second housing member 16 that collectively surround the motor 30 and the pump 44 and at least partially define the extents of the motor 30 and the pump 44. The pump 44 is nested within the motor 30 such that the motor 30 surrounds the pump 44 in a radial direction (arrow 90). An axial direction is defined perpendicular to the radial direction and is indicated with arrow 92. As shown in FIG. 5, the axial extents of the pump elements (inner gear 56, outer gear 58, and gear pump crescent 60, which are shown in greater detail in FIG. 4) lie within the axial extents of the motor elements (rotor 32, stator 34). Written another way, the pump 44 is nested within the motor 30 such that a radial line drawn outward from any pump element also extends through a motor element. The pump elements and motor elements are described in greater detail below.

Figure 2:
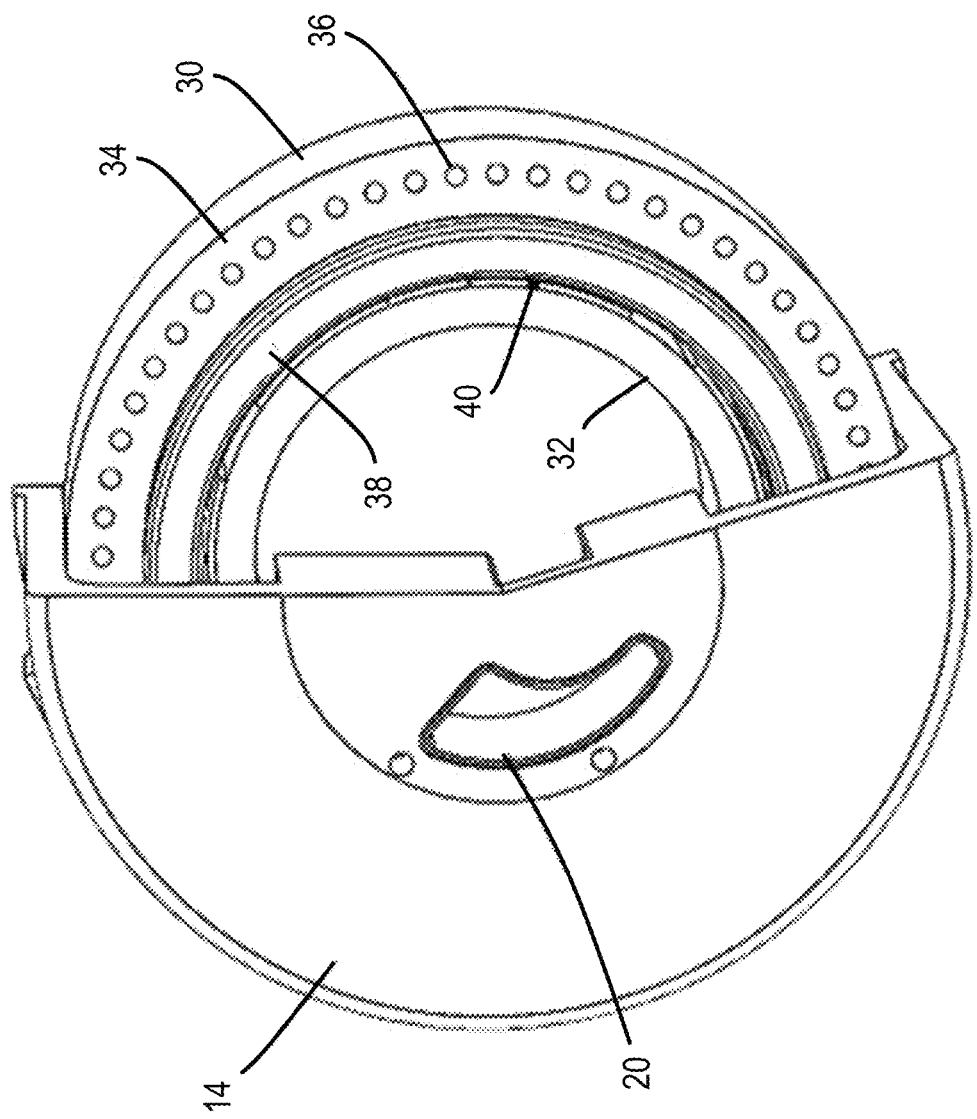
FIG. 2 is a cutaway perspective view of the electric and hydraulic machine of FIG. 1, illustrating components of an electric motor.
Figure 2:
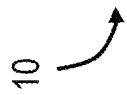

The housing 12 includes a unit inlet 18 and a unit outlet 20. As shown, both the unit inlet 18 and the unit outlet 20 are located on the same axial end of the housing 12. In other embodiments the unit inlet 18 and unit outlet 20 may be located on opposite axial ends of the housing 12. The unit inlet 18 is an opening in the housing 12 that provides the pumping fluid to a pump chamber 46 and the unit outlet 20 provides an exit from the pump chamber 46 for fluid displaced by the pump 44. As shown in FIG. 2, the unit inlet 18 and unit outlet 20 are positioned radially inward of the motor 30. Therefore, fluid entering the unit inlet 18 moves axially through the pump chamber 46. Based on the locations of the unit inlet 18 and pump chamber 46, fluid entering the electric and hydraulic machine 10 travels radially outward to reach the motor 30 and enter the motor chamber 28.

With reference to FIG. 1, the first housing member 14 is fastened to the second housing member 16 via a plurality of fasteners 22 located around the outer periphery of the electric and hydraulic machine 10. A seal (not shown) may be positioned at the joint between the two housing members 14, 16 to produce a fluid tight seal therebetween. As shown in FIG. 2, the motor includes a rotor 32 and a stator 34. The rotor 32 is positioned radially within the stator 34 and axially aligned with the stator 34 such that the rotor 32 is nested within the stator 34 and is configured to rotate relative to the stator 34 upon actuation. The stator 34 includes windings 38 and further includes a plurality of axial stator apertures 36 positioned around the outer periphery of the stator 34. The axial stator apertures 36 provide cooling passages for the motor 30 as described in greater detail below. As shown, the motor 30 is a permanent magnet motor and the rotor 32 is cylindrical/annular and includes permanent magnets 40 on an outer radial surface in proximity to the windings 38 of the stator 34. The motor 30 can be, for example, an induction motor, a surface permanent magnet motor, an internal permanent magnet motor, a wound rotor, or a switched reluctance motor.

Figure 3:
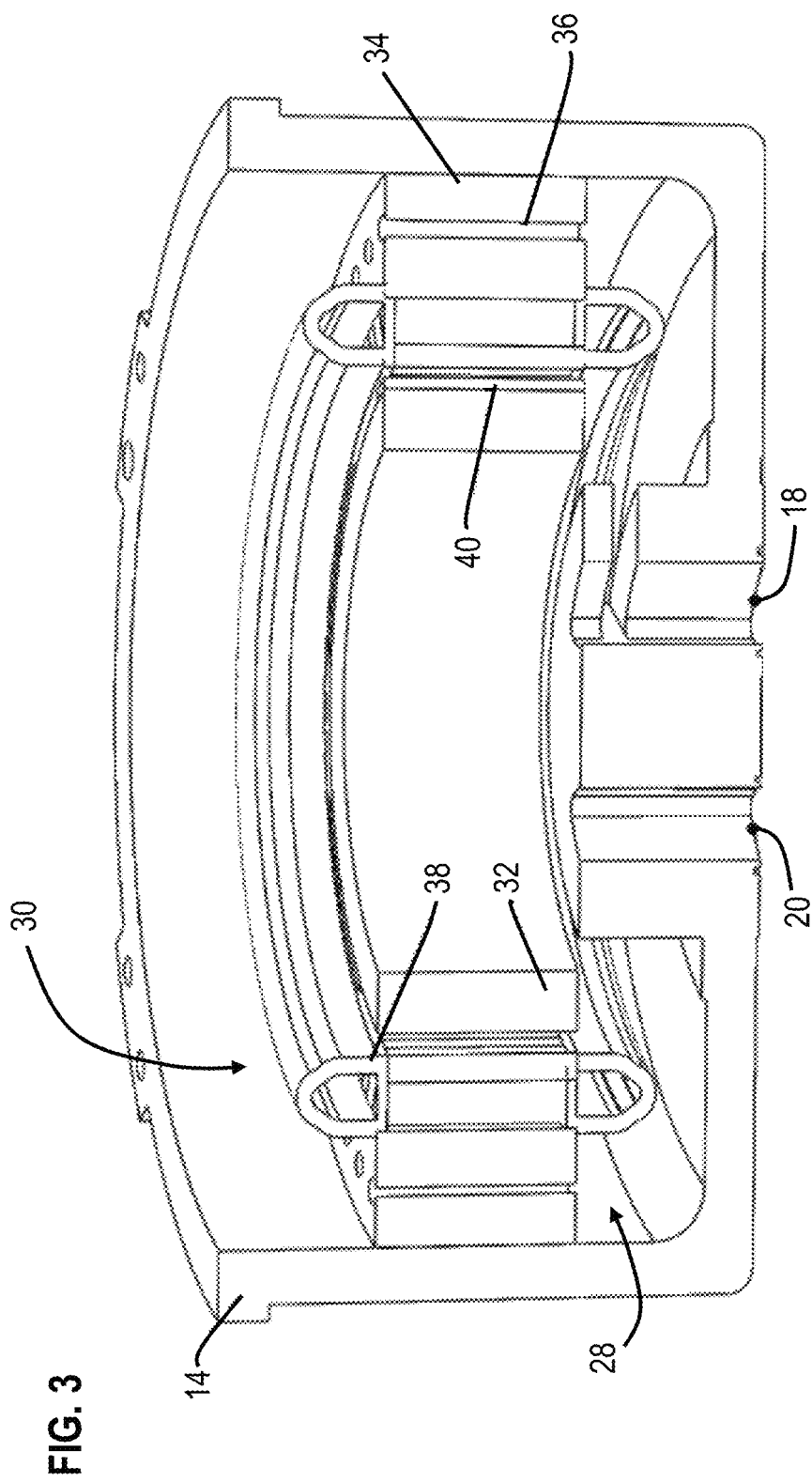
FIG. 3 is a cutaway section view of the electric motor and a first housing member of the electric and hydraulic machine.

FIG. 3 illustrates the motor chamber 28 in greater detail, relative to the first housing member 14. FIG. 3 does not illustrate the pump elements 56, 58, 60, which are otherwise shown with respect to the second housing member 16 in FIG. 4. The motor chamber 28 is defined by the housing 12 at the axial extents (via the first housing member 14 at the first axial extent and via the second housing member 16 at the second axial extent) and at the outer radial extent of the housing 12. The inner radial extent of the motor chamber 28 is partially defined by both of the first and second housing member 14, 16, and is further connected to the pump chamber 46 via openings 70, 72, 74, 76 in the housing members 14, 16, as described in greater detail below.

Figure 4:
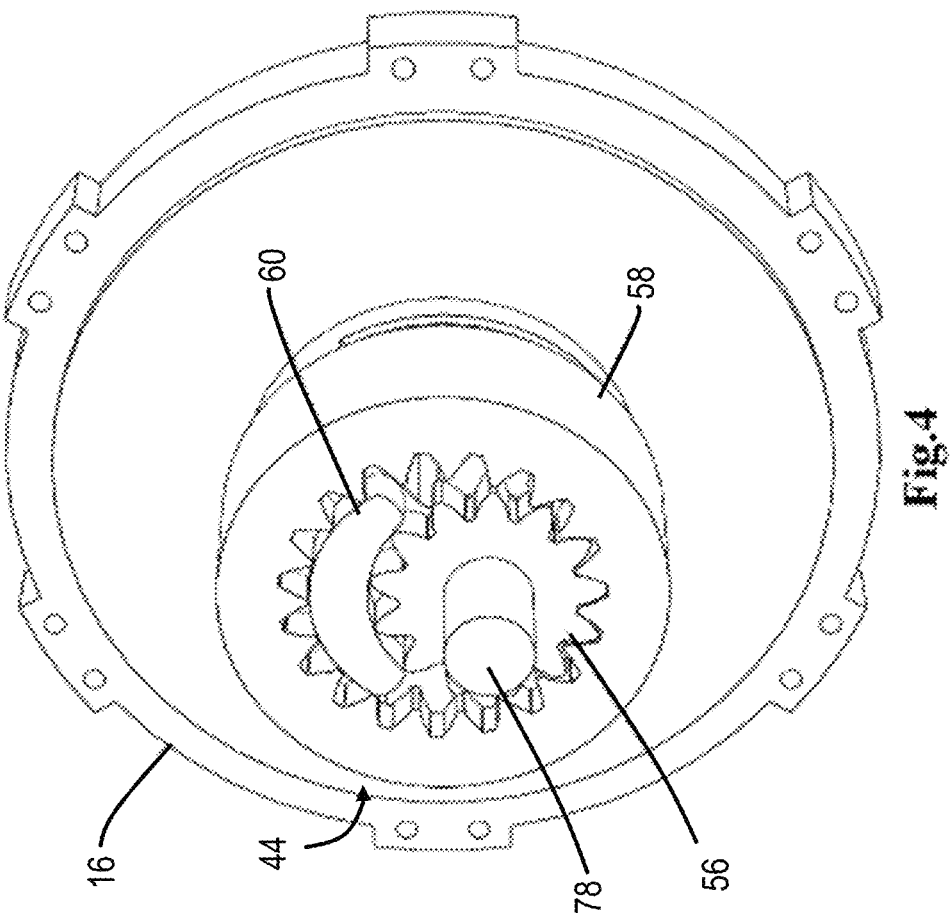
FIG. 4 is a perspective view of a hydraulic machine and a second housing member of the electric and hydraulic machine.
Figure 5:
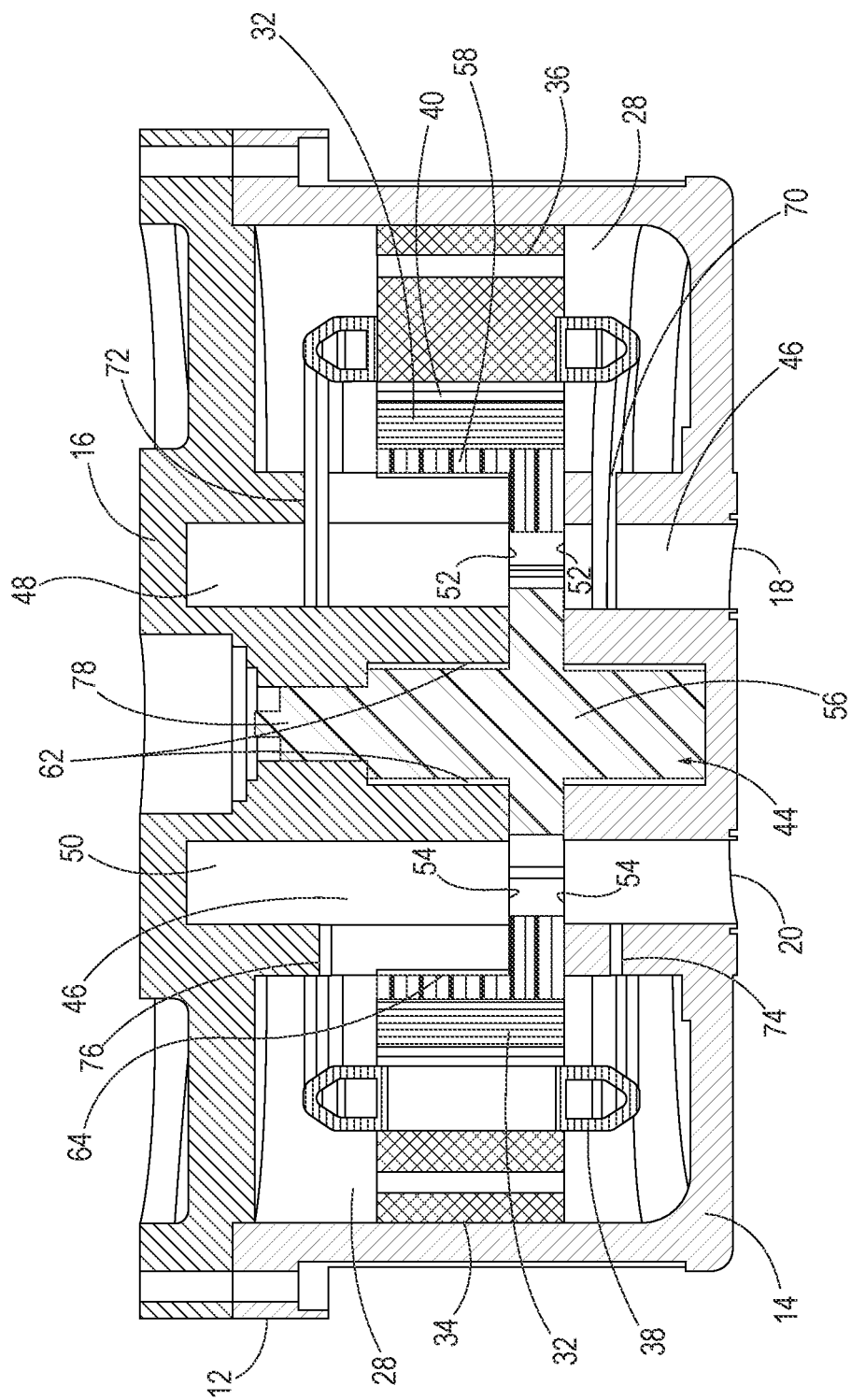
FIG. 5 is a cutaway section view of the electric and hydraulic machine.

As shown in FIG. 4, the pump 44 is an internal gear pump (gerotor pump). In other embodiments, the pump may be, for example, vain, radial pump, or an axial piston type pump. As shown, the internal gear pump 44 includes an outer gear 58 that is driven by the motor 30 when the motor 30 is actuated. In the embodiment shown in FIG. 5, the rotor 32 is coupled to the outer gear 58 such that rotation of the rotor 32 results in similar rotation of the outer gear 58. The outer gear 58 rotates relative to an inner gear 56 that is axially offset from the center of the outer gear 58. A gear pump crescent 60 is fixed relative to the gears 56, 58 to maintain the offset arrangement of the gears 56, 58 as shown in FIG. 4. Further, the inner gear 56 is mounted on or integrally formed on a shaft 78 located within recesses of the housing 12 to fix the axial and radial position of the inner gear 56 relative to the housing 12.

A pump inlet 52 provides the fluid from within the pump chamber 46 to the gears 56, 58 to be displaced. More specifically, fluid enters the electric and hydraulic machine 10 via the unit inlet 18 and passes through a low-pressure chamber 48 of the pump chamber 46 to the pump inlet 52 to be displaced. A pump outlet 54 provides fluid displaced by the pump 44 to the pump chamber 46, and specifically to a high-pressure chamber 50 of the pump chamber 46. Displaced fluid within the high-pressure chamber 50 is directed to the unit outlet 20.

Therefore, when the motor 30 is actuated, the outer gear 58 rotates relative to the inner gear 56, thereby drawing a pumping fluid from the low-pressure chamber 48 through the pump inlet 52. A fixed volume of the fluid is enclosed within intermeshing teeth of the gears 56, 58. As the inner gear 56 is radially offset from the outer gear 58, the fluid is displaced as the volume between the intermeshing teeth decreases until the fluid exits through the pump outlet 54 and to the high-pressure chamber 48. The working principle of an external gear pump unit is similar to that described above for the internal gear pump 44.

For an axial piston pump, when the electric motor is actuated, a rotary group cylinder block rotates, which in turn allows a plurality of pistons to displace along the surface of a swash plate. Depending upon the angular position of the swash plate, the pistons displace a specific amount of fluid from the low-pressure port to the high-pressure port of the unit. For a vane-type pump, when the electric motor is actuated, a vane housing allows a plurality of vanes to displace fluid between the low-pressure port and the high-pressure port.

As shown in FIG. 5, the first and second gears 56, 58 are mounted to the second housing member 16 for rotation relative to the second housing member 16. The shaft 78 is supported by both housings 14, 16, supported by the first housing member 14 at a first axial end and supported by the second housing member 16 at a second axial end, with the inner gear 56 mounted to the shaft 78 between the first and second axial ends of the shaft 78. Journal bearings 62, 64 are located between the housing member 16 and the gears 56, 58 (including the integrated shaft 78) to locate the gears 56, 58 relative to the housing member 16 and further to facilitate smooth rotation of the gears 56, 58 relative to the housing member 16. The first journal bearing 62 is located between the shaft 78 of the inner gear 56 and the recess in which the shaft 78 is received such that the first journal bearing 62 surrounds a portion of the shaft 78. The second journal bearing 64 is located between the outer gear 58 and the housing member 16. More specifically, the outer gear 58 is a cup-shaped outer gear that surrounds a portion of the housing member 16 such that the outer gear 58 is mounted on a radially outward surface of the second journal bearing 64 to surround the second journal bearing 64.

With continued reference to FIG. 5, the housing 12 includes a plurality of radial cooling channels 70, 72, 74, 76 that interconnect the motor chamber 28 to the pump chamber 46 and allow the pumping fluid to pass between the two chambers 28, 46. As the pump chamber 46 is nested within the motor chamber 28, each of the radial cooling channels extends radially outward from the pump chamber 46 to the motor chamber 28.

A first low-pressure radial cooling channel 70 extends through the first housing member 14 from the low-pressure pump chamber 48 to the motor chamber 28. The first low-pressure radial cooling channel 70 is located axially between the unit inlet 18 and the pump inlet 52. A second low-pressure radial cooling channel 72 extends through the second housing member 16 from the low-pressure pump chamber 48 to the motor chamber 28. The second low-pressure radial cooling channel 72 is axially located opposite the first low-pressure radial cooling channel 72 such that the pump inlet 52 is located axially between the two low-pressure radial cooling channels 70, 72.

The housing 12 includes similar high-pressure radial cooling channels or recirculation channels 74, 76 that are located in respective housings 14, 16 and extend between the high-pressure pump chamber 50 and the motor chamber 28 in a radial direction. The first high-pressure radial cooling channel 74 is positioned axially between the pump outlet 54 and the unit outlet 20 and the second high-pressure radial cooling channel 76 is positioned opposite the first high-pressure radial cooling channel 74 such that the pump outlet 54 is located axially between the two high-pressure radial cooling channels 74, 76.

The diameter of the low-pressure radial cooling channels 70, 72 is greater than the diameter of the high-pressure radial cooling channels 74, 76, thereby allowing a greater quantity of fluid to the motor chamber 28 via the low-pressure radial cooling channels 70, 72 to account for the increased pressure of the fluid entering the motor chamber 28 through the high pressure radial cooling channels 74, 76 and to further avoid drastically decreasing the pressure of the fluid exiting the unit outlet 20.

Figure 6:
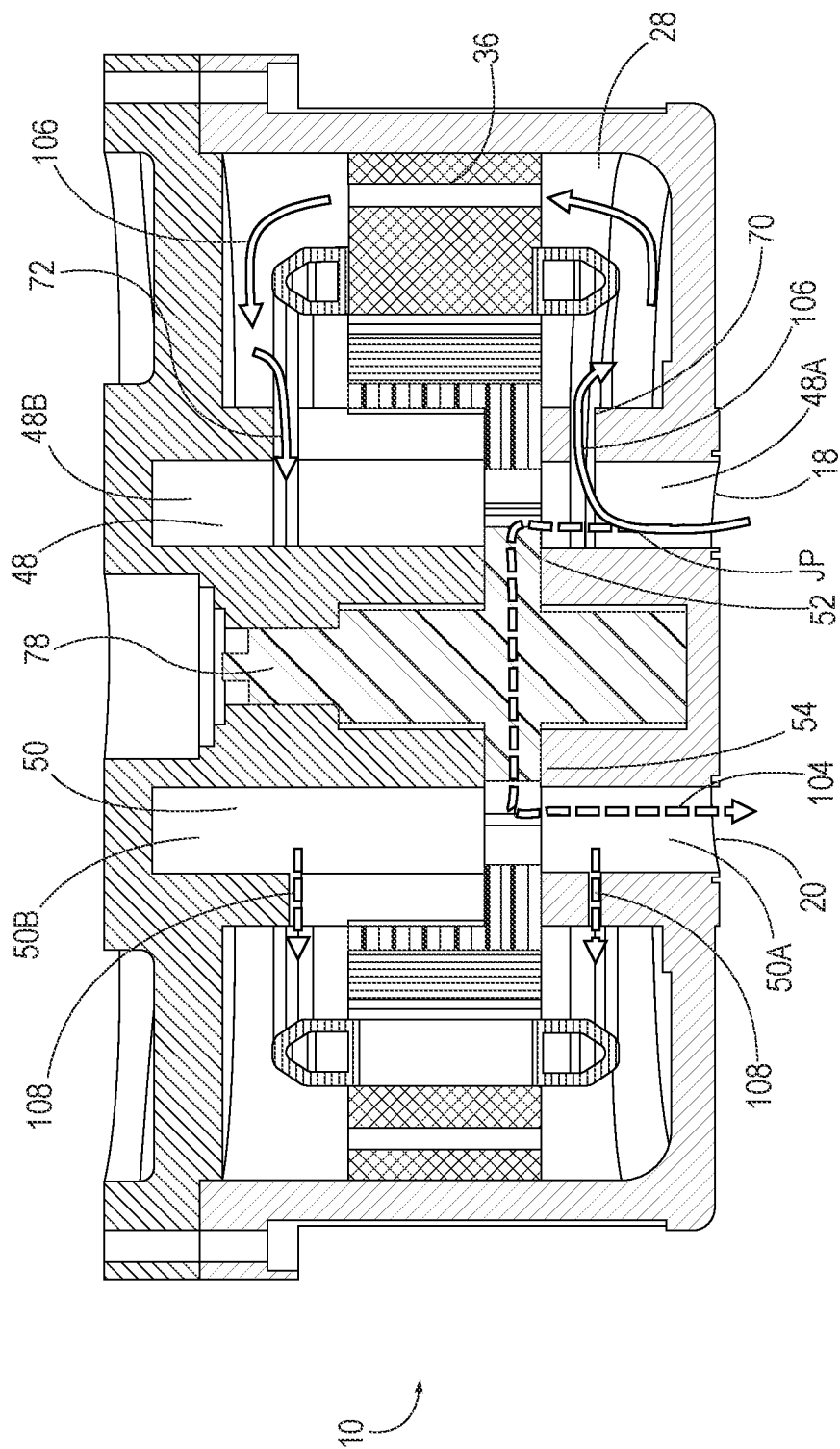
FIG. 6 is a cutaway section view of the electric and hydraulic machine illustrating various flow routes therethrough.

FIG. 6 illustrates a cross-section of the electric and hydraulic machine 10 and includes arrows indicating different flow routes from the unit inlet 18 to the unit outlet 20. A first flow route 104 (dashed lines) extends from the unit inlet 18 into the low-pressure chamber 48, between the unit inlet 18 and the pump inlet 52. The first flow route 104 continues through the pump 44 (through the pump inlet 52 to the pump outlet 54), pressurizing the fluid passing therethrough. The first flow route 104 then continues from the pump outlet 54 to the unit outlet 20.

The low-pressure chamber 48 is shown in FIG. 6 as including a front portion 48A of the low-pressure chamber 48 between the unit inlet 18 and the pump inlet 52/gears 56, 58. A rear portion 48B of the low-pressure chamber 48 extends between a rear axial extent of the chamber 48 and the pump inlet 52/gears 56, 58. Similarly, the high-pressure chamber 50 is illustrated in FIG. 6 as including a front portion 50A between the pump outlet 54 and the unit outlet 20 and a rear portion 50B between the pump outlet 54 and the rear axial extent of the chamber 50.

A motor cooling passage or second flow route 106 extends from the unit inlet 18 into the low-pressure chamber 48, between the unit inlet 18 and the pump inlet 52. Within the low-pressure chamber 48, the second flow route 106 deviates from the first flow route 104. Instead of continuing to the pump inlet 52, the second flow route 106 extends/diverges radially outward through the first low-pressure radial cooling channel 70, to enter the motor chamber 28. Within the motor chamber 28, the pumping fluid cools the motor 30. The second flow route 106 continues axially through the motor chamber 28. As shown, the stator 34 includes axial apertures 36 through which the pumping fluid can flow along the second flow route 106 to cool the motor 30. Additional fluid may flow between the rotor 32 and stator 34 and otherwise axially through the motor housing 28. The second flow route 106 continues radially inward from the motor chamber 28 back to the low-pressure chamber 48 via the second low-pressure radial cooling channel 72. The second low-pressure radial cooling channel 72 directs the second flow route 106 to a rear side of the low-pressure chamber 48 such that the second flow route 106 has effectively axially bypassed the pump inlet 52. From here, the second flow route 106 continues through the pump 44 (through the pump inlet 52 to the pump outlet 54), pressurizing the fluid passing therethrough. The second flow route 106 then continues from the pump outlet 54 to the unit outlet 18.

The second flow route 106 separates from the first flow route 104 at a junction point JP in the low-pressure chamber 48 between the unit inlet 18 and the pump inlet 52. The second flow route 106 rejoins with the first flow route 104 at the pump inlet 52. Collectively, the two flow routes 104, 106 provide fluid from the unit inlet 18, through the pump 44 and to the unit outlet 20 while also cooling the motor 30.

Figure 7:
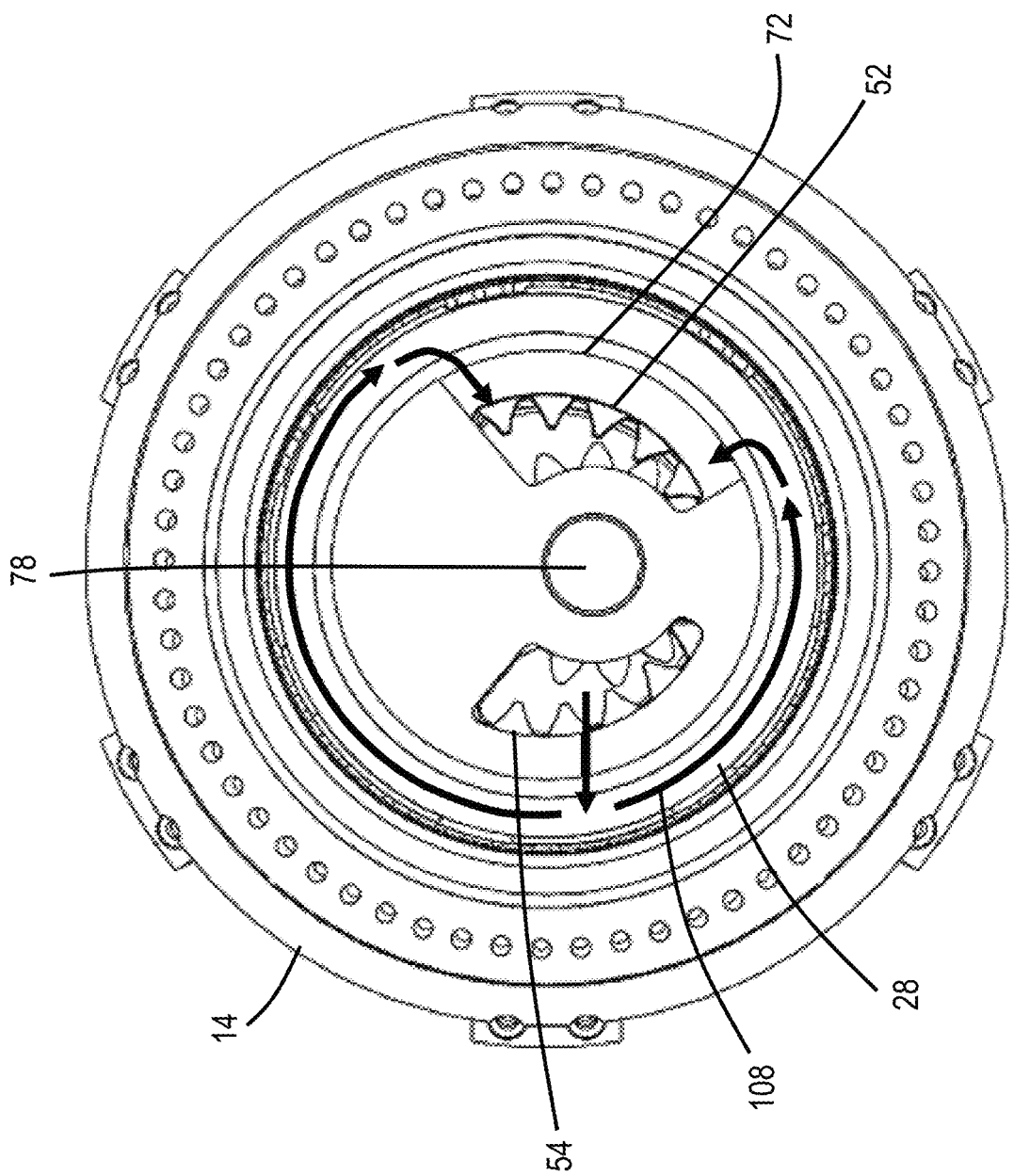
FIG. 7 is an axial end section view of the electric and hydraulic machine illustrating the various flow routes therethrough

FIGS. 6-7 illustrate a recirculation passage or third flow route 108 that routes displaced fluid (displaced by the pump 44) from the high-pressure chamber 50 back to the low-pressure chamber 48. As shown in FIG. 6, the displaced fluid in the high-pressure chamber 50 passes through the high-pressure radial cooling channels 74, 76 into the motor chamber 28 along the third flow route 108. As shown in FIG. 7, the third flow route 108 travels through the motor chamber 28 to one or both of the first and second low pressure radial cooling channels 70, 72, where the fluid returns to the low-pressure chamber 48. The pressure of the fluid from the high-pressure chamber 50 (i.e., along the third flow route 108) is greater than the pressure of the fluid from the low-pressure chamber 48 (i.e., along the second flow route 106), thereby promoting flow and preventing stagnation of the fluid within the motor chamber 28.

Figure 8:
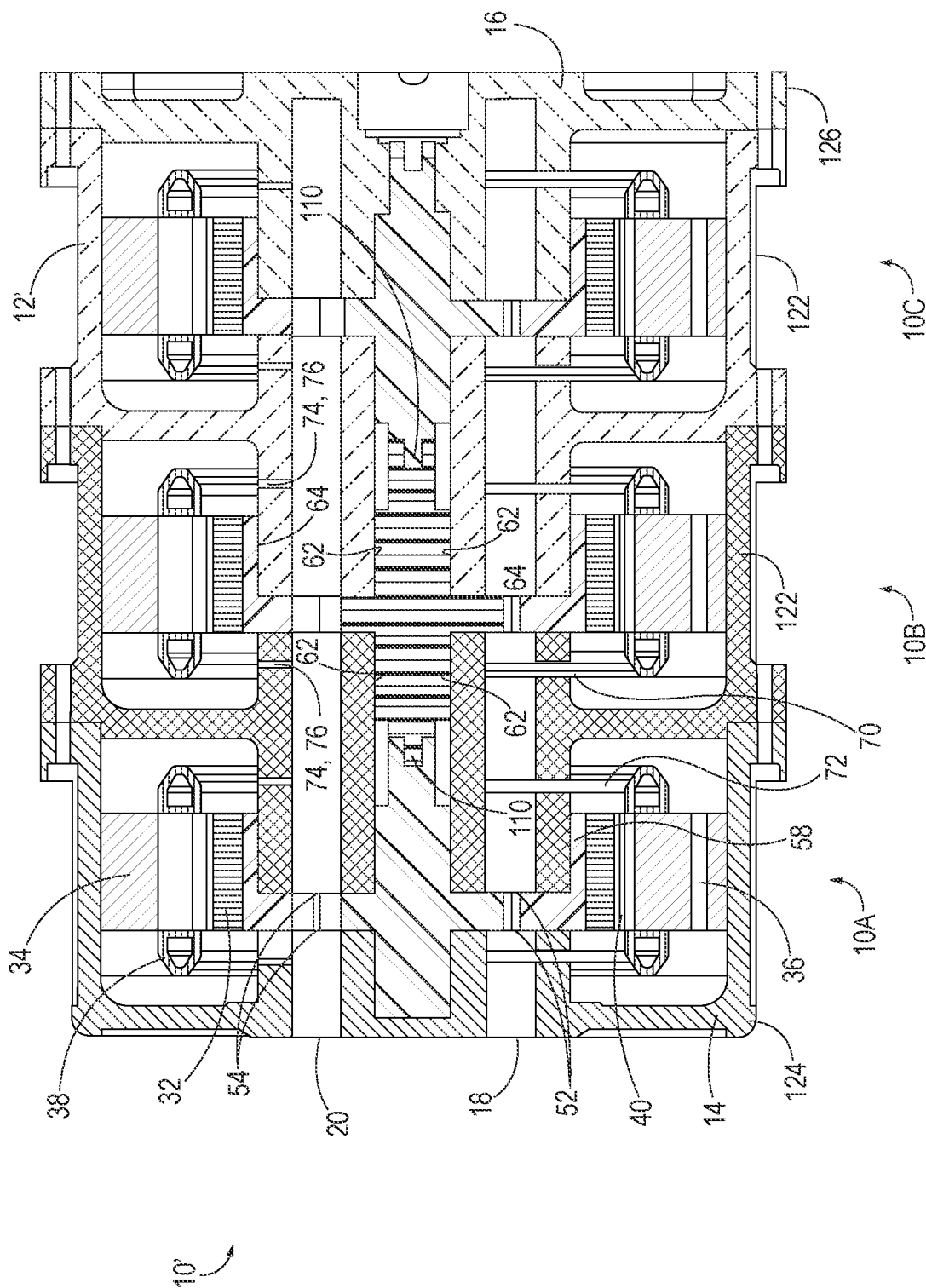
FIG. 8 is a cutaway section view of an axial stack of multiple electric and hydraulic machines.
Figure 9:
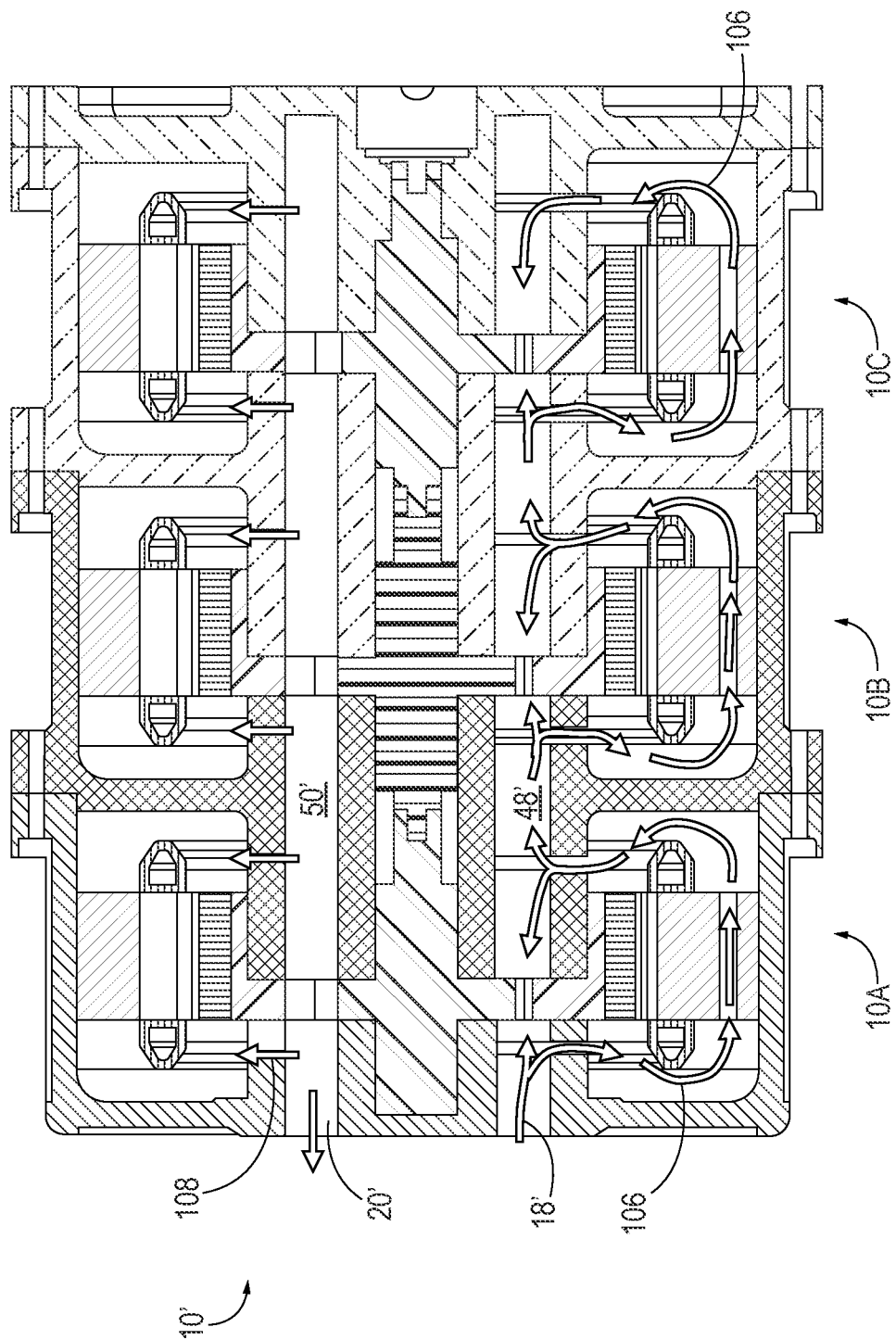
FIG. 9 is a cutaway section view of the axial stack, illustrating various flow routes therethrough.
Figure 10:
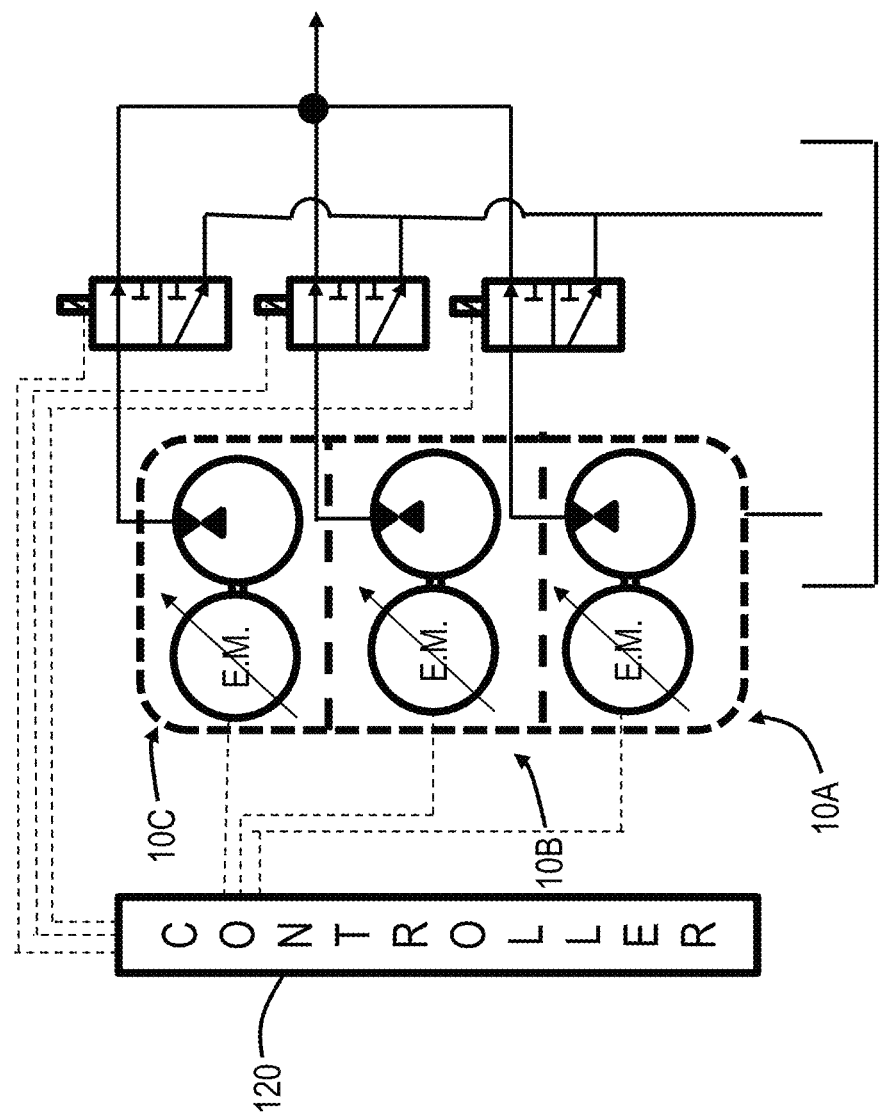
FIG. 10 is a schematic representation of an axial stack.

FIGS. 8-10 illustrate an axially stacked arrangement of individual electric and hydraulic machines 10A, 10B, 10C to form a single, larger electric and hydraulic machine 10'. The electric and hydraulic machines 10A, 10B, 10C are modular and can be stacked to increase the outlet flow rate of the machine 10'. While the arrangement shown in FIGS. 8-10 includes three electric and hydraulic machines 10A, 10B, 10C, fewer or more electric and hydraulic machines 10 may be axially stacked to suit the needs of a specific job or application. Modifications may be made to the housing 12' shown in FIG. 1 to facilitate stacking of the machines 10A, 10B, 10C, as shown in FIG. 8. As shown, two identical housing portions 122 and two endcap housing portions 124, 126 that are dissimilar from the two identical housing portions 122 collectively form the housing 12'. Components of the first and second housing members 14, 16 are combined together in the identical housing portions 122. The endcap housing portions 124, 126 collectively support the axial ends of the shafts 78.

Each electric and hydraulic machine 10A, 10B, 10C in the stack includes its own pump 44 having a pump inlet 52 and pump outlet 54. Further, each electric and hydraulic machine 10A, 10B, 10C includes its own motor 30 for driving the respective pump 44. In some embodiments, the pumps 44 are fully decoupled from one another such that each pump 44 and respective gear arrangement 56, 58 is operable independently of operation of the other pumps 44 and gear arrangements 56, 58. In other embodiments, the shafts 78 of the respective inner gears 56 may be coupled together with coupling mechanisms 110. Coupling the shafts 78 of the inner gears 56 forces the motors 30 to rotate synchronously, thereby leading to the usage of a single inverter for all the electric machines, and therefore to a decrease of the cost, design complexity, and space required.

Further, through the fixed coupling of the pumps 44, the pumps 44 can be assembled in such a way that a lag is introduced between their flow ripples. The result of the lag is an overall flow ripple with a higher frequency and a lower amplitude that can mitigate cogging of the actuator, stress on components, and reduce the overall noise.

Further still, the stacked architecture enables an advanced control strategy, controllable via a controller 120 (FIG. 10). From an electronic point of view, in case of a high flow demand and a low-pressure demand, one or more motors 30 can be deactivated, thereby allowing the remaining motors (s) 30 to work closer to their efficiency maximum peak. From a hydraulic point of view, a digital system may be implemented. When pumping against a high differential pressure, one or more of the pumps 44 may be decoupled from the main circuit and pump directly to a tank or reservoir. This arrangement decreases the outlet flow and additionally decreases the torque applied on each motor 30, resulting in a potential downsizing of the motors 30.

As shown in FIGS. 8-9, the low-pressure chambers 48 of the three machines 10A, 10B, 10C are interconnected with one another such that they collectively form a single, larger low-pressure chamber 48'. Similarly, the high-pressure chambers 50 of the three machines 10A, 10B, 10C are interconnected with one another such that they collectively form a single, larger high-pressure chamber 50'. The unit inlet 18' of the machine 10' is the unit inlet 18 of the first electric and hydraulic machine 10A. For fluid to enter the low-pressure chamber 48 of the subsequent, second electric and hydraulic machine 10B, the fluid passes through the unit inlet 18 of the first machine 10A, the low-pressure chamber 48 of the first machine 10A, and the unit inlet 18 of the second machine 10B. Likewise, for fluid to enter the low-pressure chamber 48 of the third machine 10C, the fluid passes to the low-pressure chamber 48 of the second machine 10B as described above and through the unit inlet 18 of the third machine 10C. Fluid passes to the low-pressure chamber 48 of each machine 10A, 10B, 10C without first being displaced by any of the pumps 44 in the machine 10'. While some previously displaced fluid may reach the low-pressure chambers 48 via the recirculation passage 108 as described above with respect to FIGS. 6-7, the low-pressure chambers 48 are additionally arranged to receive fluid that has not been displaced by any of the pumps 44.

The high-pressure chambers 50 of the three machines 10A, 10B, 10C are generally similar in arrangement and interconnectivity to the low-pressure chambers 48 described above. The high-pressure chambers of the machines 10A, 10B, 10C are interconnected with one another such that they collectively form a single, larger high-pressure chamber 50'. The unit outlet 20' of the machine 10' is the unit outlet 20 of the first machine 10A. For fluid to reach the unit outlet 20', the fluid passes axially through any high-pressure chambers 50 located therebetween. For example, fluid from the third machine 10C travels from the high-pressure chamber 50 of the third machine 10C, through the unit outlet 20 of the third machine 10C, into the high-pressure chamber 50 of the second machine 10B, through the unit outlet of the second machine 10B, into the high-pressure chamber 50 of the first machine 10A, and through the unit outlet 20'.

As shown in FIG. 9, the low-pressure radial cooling channels 70, 72 and motor chambers 28 provide a pathway via the second flow route 106 for moving fluid from the first machine 10A to the second machine 10B and from the second machine 10B to the third machine 10C. Further, the arrangement provides cooling for all motors 30 in the machine 10'.

Therefore, machines 10A, 10B, 10C of the modular electric and hydraulic machine 10' are not in series with one another as the machines 10A, 10B, 10C do not transfer the output of one pump to the inlet of a next pump. Rather, the pumps function in a parallel arrangement, condensed into a single machine 10', and having common low and high-pressure chambers 48', 50'.

Various features of the disclosure are set forth in the following claims.

The invention claimed is:

1. An electric and hydraulic machine comprising:
a housing defining a motor chamber and a pump chamber;
a motor comprising a rotor and a stator positioned within the motor chamber;
a pump comprising a pumping element positioned within the pump chamber, the pumping element movable by the motor to displace fluid in the pump chamber, the pump chamber including a low-pressure chamber and a high-pressure chamber, a unit inlet defined by the housing and in communication with the low-pressure chamber, and a unit outlet defined by the housing and in communication with the high-pressure chamber, the pump chamber positioned radially inward of the motor chamber such that the pump is nested within the motor; and a radial cooling channel extending in a radial direction from the low-pressure chamber to the motor chamber such that the fluid in the pump chamber communicates with the rotor and the stator to cool the motor.

2. The electric and hydraulic machine of claim 1, wherein the motor includes a first axial extent and a second axial extent opposite the first axial extent, and wherein the pumping element is fully nested within the motor.

3. The electric and hydraulic machine of claim 1, wherein the radial cooling channel is a first radial cooling channel, the electric and hydraulic machine further comprising a second radial cooling channel extending radially from the low-pressure chamber to the motor chamber, wherein the first radial cooling channel is located axially to a first side of the pumping element, and wherein the second radial cooling channel is located axially to a second side of the pumping element, opposite the first side.

4. The electric and hydraulic machine of claim 1, wherein the radial cooling channel is a low-pressure radial cooling channel, the electric and hydraulic machine further comprising a high-pressure radial cooling channel extending from the high-pressure chamber to the motor chamber.

5. The electric and hydraulic machine of claim 4, wherein the high-pressure radial cooling channel has a smaller cross-section than the low-pressure radial cooling channel.

6. The electric and hydraulic machine of claim 1, wherein the radial cooling channel defines a portion of a motor cooling passage, wherein the stator includes a plurality of axial stator apertures, and wherein the plurality of axial stator apertures define a portion of the motor cooling passage.

7. The electric and hydraulic machine of claim 6, wherein the motor cooling passage is fully defined within the housing and extends from the low-pressure chamber, through the motor chamber and returns to the low-pressure chamber.

8. The electric and hydraulic machine of claim 1, wherein the radial cooling channel extends radially outward from the pump chamber to the motor chamber.

9. The electric and hydraulic machine of claim 1, wherein the rotor is fixed to the pumping element such that the motor is directly coupled to the pump.

10. The electric and hydraulic machine of claim 1, wherein the pump is a first pump and the motor is a first motor, the electric and hydraulic machine further comprising a second pump and a second motor, wherein the second pump and the second motor are axially aligned with the first pump and first motor, respectively, wherein the low-pressure chamber of the first pump is in fluid communication with a low-pressure chamber of the second pump such that the radial cooling channel is in fluid communication with a radial cooling channel of the second pump extending in a radial direction from the low-pressure chamber of a second pump to the motor chamber of the second motor.

11. A method of operating an electric and hydraulic machine, the method comprising:
providing a working fluid to a low-pressure chamber of a pump via an inlet of the pump;
actuating a motor within a housing, the motor located within a motor chamber defined by the housing;
driving the pump with the motor to displace the working fluid from the low-pressure chamber to a high-pressure chamber;
providing the working fluid displaced by the pump to an outlet of the pump; and
cooling the motor with the working fluid by directing a first portion of the working fluid within the low-pressure chamber through a radial cooling channel to the motor chamber, wherein the first portion of the working fluid passes through the radial cooling channel from the low-pressure chamber upstream of the high-pressure chamber.

12. The method of claim 11, wherein the radial cooling channel is a first radial cooling channel, the method further comprising returning the first portion of the working fluid from the motor chamber to the low-pressure chamber via a second radial cooling channel.

13. The method of claim 11, wherein cooling the motor with the working fluid includes directing the working fluid through axial stator apertures in a stator of the motor.

14. The method of claim 11, wherein the radial cooling channel is a low-pressure radial cooling channel, the method further comprising cooling the motor with the working fluid by directing a second portion of the working fluid from the high-pressure chamber through a high-pressure radial cooling channel to the motor chamber.

15. The method of claim 14, further comprising recirculating the second portion of the working fluid from the high-pressure radial cooling channel, through the motor chamber, and to the low-pressure radial cooling channel.

16. An electric and hydraulic machine comprising:
a housing defining a motor chamber and a pump chamber;
a motor comprising a rotor and a stator positioned within the motor chamber;
a pump comprising a pumping element positioned within the pump chamber, the pumping element movable by the motor to displace fluid in the pump chamber, the pump chamber including a low-pressure chamber and a high-pressure chamber, a unit inlet defined by the housing and in communication with the low-pressure chamber, and a unit outlet defined by the housing and in communication with the high-pressure chamber, the pump chamber positioned radially inward of the motor chamber such that the pump is nested within the motor;
a first flow route for a working fluid of the pump, the first flow route extending from the low-pressure chamber, to the pumping element, to the high-pressure chamber, and to the unit outlet; and
a second flow route for the working fluid of the pump, the second flow route extending from the low-pressure chamber, through a radial cooling channel extending radially outward from the low-pressure chamber, and into the motor chamber.

17. The electric and hydraulic machine of claim 16, wherein the radial cooling channel is a first radial cooling channel extending radially from the low-pressure chamber to the motor chamber, the electric and hydraulic machine further comprising a second radial cooling channel extending radially from the motor chamber to the low-pressure chamber, wherein the second flow route further extends from the motor chamber through the second radial cooling channel and into the low-pressure chamber.

18. The electric and hydraulic machine of claim 16, wherein the stator includes a plurality of axial stator apertures, and wherein the second flow route extends through the plurality of axial stator apertures.

19. The electric and hydraulic machine of claim 16, wherein the second flow route is fully defined within the housing.

20. The electric and hydraulic machine of claim 16, wherein the pump is a first pump and the motor is a first motor, the electric and hydraulic machine further comprising a second pump and a second motor, wherein the second pump and the second motor are axially aligned with the first pump and first motor, respectively, wherein the second flow route is configured to provide the working fluid to a low-pressure chamber of the second pump.

* * * * *